United States Patent [19]

Parr

[11] 4,353,619
[45] Oct. 12, 1982

[54] DISCONNECTABLE OPTICAL FIBRE JOINT

[75] Inventor: David T. Parr, Warrington, England

[73] Assignee: BICC Limited, London, England

[21] Appl. No.: 148,925

[22] Filed: May 12, 1980

[30] Foreign Application Priority Data

Jan. 30, 1980 [GB] United Kingdom ................. 8003181
Apr. 3, 1980 [GB] United Kingdom ................. 8011193

[51] Int. Cl.³ .............................................. G02B 7/26
[52] U.S. Cl. ................................................. 350/96.21
[58] Field of Search ........................... 350/96.20, 96.21

[56] References Cited

U.S. PATENT DOCUMENTS

| 3,960,531 | 6/1976 | Kohanzadeh | 350/96.21 |
| 4,019,241 | 4/1977 | Logan | 350/96.21 |
| 4,088,386 | 5/1978 | Hawk | 350/96.21 |
| 4,146,301 | 3/1979 | Cherin et al. | 350/96.21 |
| 4,220,397 | 9/1980 | Benasutti | 350/96.21 |

FOREIGN PATENT DOCUMENTS

| 2602661 | 7/1977 | Fed. Rep. of Germany | 350/96.21 |
| 1470901 | 4/1977 | United Kingdom | 350/96.21 |

Primary Examiner—John D. Lee
Attorney, Agent, or Firm—Buell, Blenko, Ziesenheim & Beck

[57] ABSTRACT

A joint between two optical fibres comprises two cylindrical rods positioned with their longitudinal axes substantially parallel on a support device of such a form that the cylindrical rods are constrained to lie in tangential contact with one another to define between them an interstitial space, the two rods and the support device forming a sub-assembly; two optical fibres aligned in the interstitial space defined by the two rods so that the end faces of the optical fibres substantially abut; an elongate holding member positioned over the ends of the optical fibres aligned in the interstitial space to cover the interstitial space over at least a part of its length; and over the elongate holding member there is applied at least one resilient spring clip which so engages the sub-assembly that the elongate holding member is urged towards the two rods to secure the optical fibres with their end faces substantially abutting in the interstital space between the two rods.

6 Claims, 5 Drawing Figures

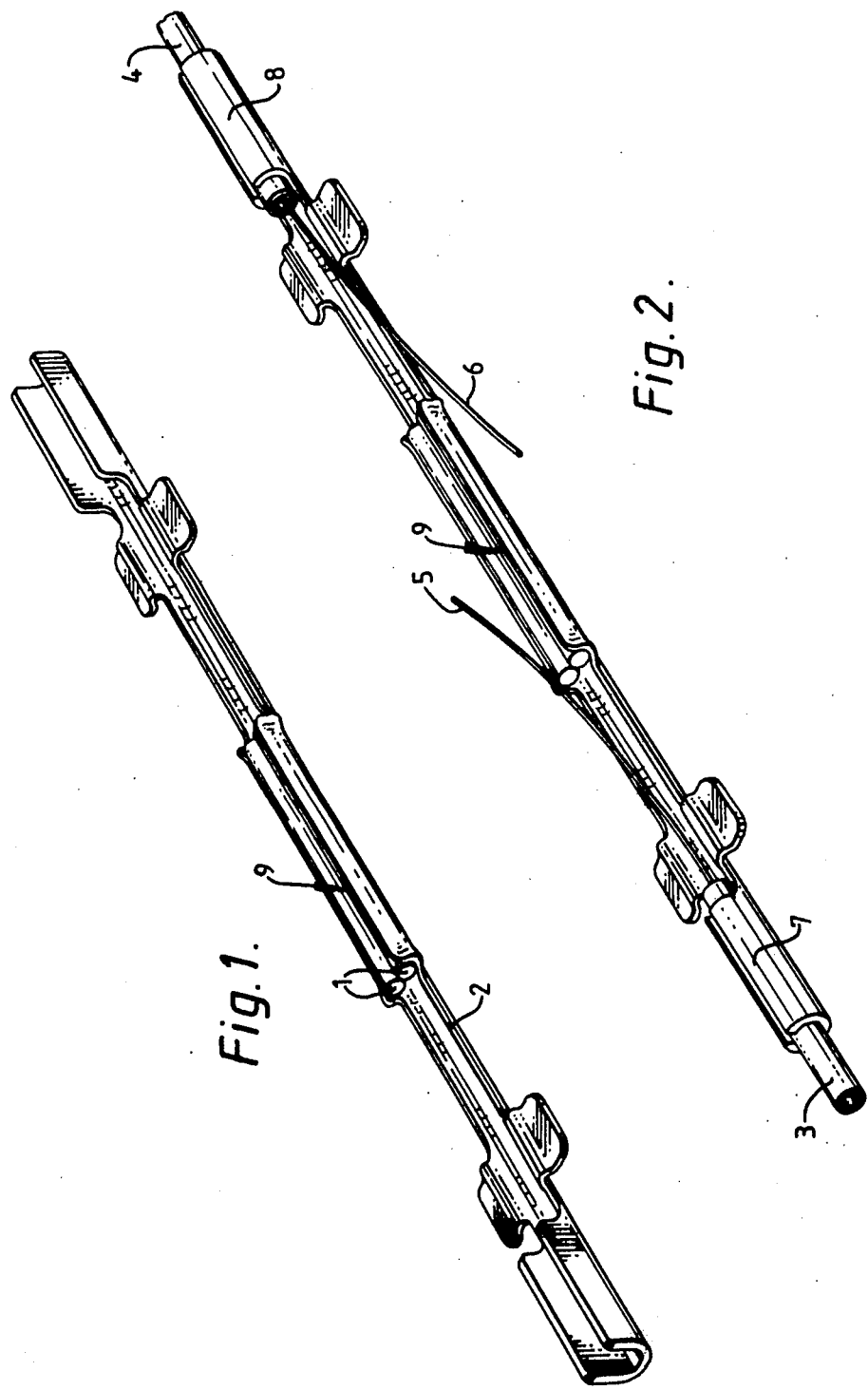

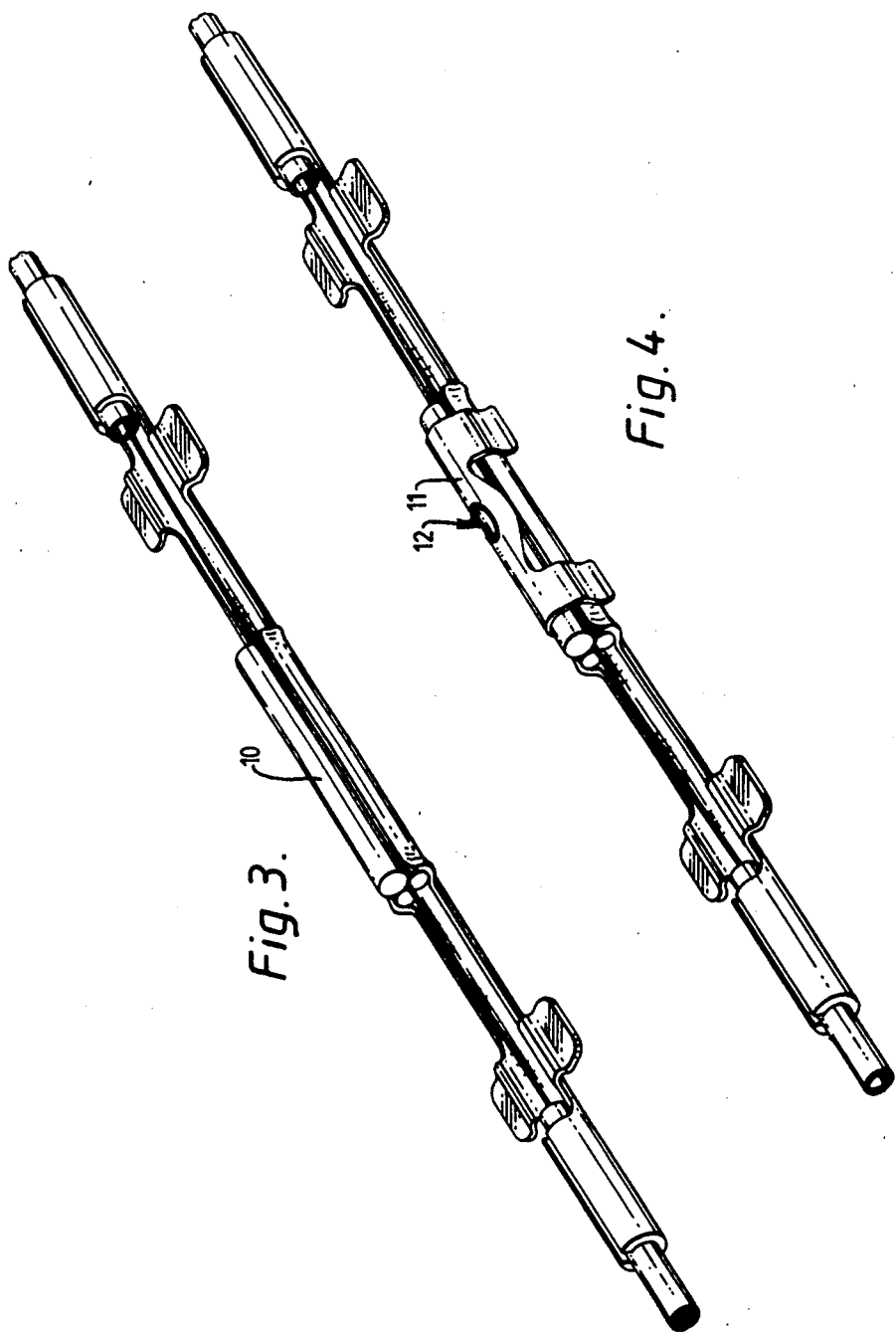

DISCONNECTABLE OPTICAL FIBRE JOINT

This invention relates to a method of effecting a joint between two optical fibres, one or each of which may be an element of an optical cable, and to an optical fibre joint.

By the expression "optical fibre" is meant a fibre of glass or other transparent material that is suitable for the transmission of the ultra-voilet, visible and infra-red regions of the electromagnetic spectrum, which regions, for convenience, will hereinafter be included in the generic term "light".

According to the invention the method comprises positioning two cylindrical rods with their longitudinal axes substantially parallel on a support device of such a form that the cylindrical rods are constrained to lie in tangential contact with one another to define between them an interstitial space, the two rods and the support device forming a sub-assembly; aligning two optical fibres in the interstitial space defined by the two rods so that the end faces of the optical fibres substantially abut; positioning an elongated holding member over the ends of the optical fibres aligned in the interstitial space to cover the interstitial space over at least a part of its length; and applying over the elongate holding member at least one resilient spring clip which so engages the sub-assembly that the elongate holding member is urged towards the two rods to secure the optical fibres with their end faces substantially abutting in the interstitial space between the two rods.

Preferably, before the optical fibres are introduced into the interstitial space, an index matching liquid or resin is applied to an end part of one or each optical fibre and/or is introduced into the interstitial space in the region where the end faces of the optical fibres are substantially to abut, thereby to improve the light coupling efficiency between the two optical fibres.

The or each resilient spring clip preferably engages the support device of sub-assembly. Alternatively the or each resilient spring clip engages the two rods of the sub-assembly or the two rods and the support device.

Preferably, an elongate outer cover is applied over the joint and may be slipped or fastened to the assembled joint and/or to an underlying support for the support device.

The invention also includes an optical fibre joint comprising a sub-assembly comprising a support device and two cylindrical rods carried by the support device and constrained to lie in tangential contact with one another with their longitudinal axes substantially parallel, the two cylindrical rods defining between them an interstitial space; two optical fibres aligned in the interstitial space with their end faces substantially abutting; an elongate holding member positioned over the ends of the optical fibres and covering the interstitial space over at least a part of its length; and at least one resilient spring clip applied over the elongate holding member and engaging the sub-assembly to urge the elongate holding member towards the two rods so that the optical fibres are secured with their end faces substantially abutting in the interstitial space between the two rods.

Preferably, the two cylindrical rods are of substantially the same cross-sectional shape and size. The elongate holding member is preferably also a cylindrical rod which may or may not be of the same cross-sectional shape and size as one or both of the two cylindrical rods. The two cylindrical rods of the sub-assembly and the elongate holding member are preferably of a material or materials having a low co-efficient of thermal expansion, for example, stainless steel or a ferrous-nickel alloy such as that sold under the trade name "Invar".

In some circumstances the holding member may be made of a clear acrylic resin or other suitable transparent material so that visual inspection of the joint can be made after the joint is assembled.

Each optical fibre is preferably surrounded by a sheath, with the ends of the optical fibres bared to facilitate jointing. Preferably, each optical fibre is a loose fit in its sheath. Where the support device of the sub-assembly is of elongate form, it preferably has integral with and spaced from each of its ends, a ferrule or other means by which the sheath of each optical fibre can be secured. The longitudinal axes of the ferrules and the longitudinal axis of the interstitial space defined by the two cylindrical rods of the sub-assembly preferably lie in the same plane. All the longitudinal axes may lie in a straight line, but preferably the longitudinal axes of the ferrules lie at an acute angle to the longitudinal axis of the interstitial space. The other means by which the sheath of an optical fibre can be secured may be at least one resilient spring clip which is applied over the sheath and engages an integral part of the support device.

Preferably, the support device of the sub-assembly is an elongate member of channel-shaped cross-section made from a metal or metal alloy preform, for example, phosphor bronze.

The or each resilient spring clip is preferably made from beryllium copper or from brass.

The invention further includes a kit of parts for assembling an optical fibre joint as hereinbefore described.

The invention is further illustrated by a description, by way of example, of the preferred method of effecting a disconnectable joint between two optical fibres with reference to the accompanying drawings in which FIG. 1 is a view of a sub-assembly of the optical joint;

FIG. 2 is a view of the sub-assembly shown in FIG. 1, with the optical fibre sheaths secured in position;

FIG. 3 is a view of the sub-assembly shown in FIG. 2, with an elongate holding member in position;

FIG. 4 is a view of the sub-assembly shown in FIG. 3, with a resilient spring clip in position.

Figure 5:
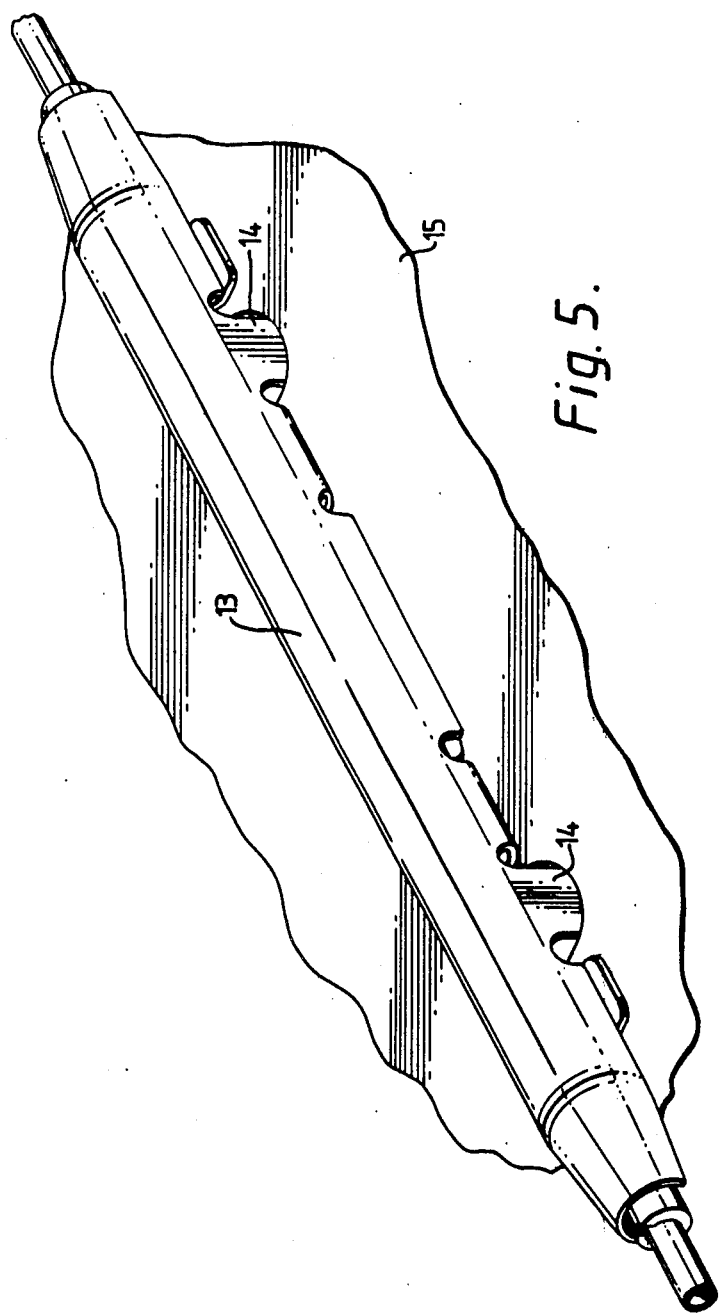
FIG. 5 is a view of the assembly shown in FIG. 4 with an outer cover and support member in position.

Referring to the drawings, initially a sub-assembly of two cylindrical rods 1 (FIG. 1) of similar cross-section and a support device in the form of an elongate member of channel shaped cross-section 2 which is made from phosphor bronze material is formed by positioning the rods in the central section of the channel shaped member such that the rods are constrained to lie in tangential contact with one another to form between them an interstitial space 9. Sheaths 3, 4 (FIG. 2) which loosely surround two optical fibres 5, 6 are crimped in two ferrules 7, 8 constituting integral parts of the channel-shaped member 2. The longitudinal axes of the ferrules 7, 8 lie in the same plane as, and in a straight line with, the longitudinal axis of the interstitial space 9.

The optical fibres 5, 6 which are of similar cross-section are then placed in the interstitial space 9 so that the ends of the optical fibres abut. An elongate holding member in the form of a third cylindrical rod 10 (FIG. 3) is then positioned over the optical fibres 5, 6.

The cylindrical rod 10 has a larger cross-section than the two cylindrical rods 1 and is made from clear acrylic resin. The cylindrical rod 10 is urged towards the two rods by a resilient spring clip 11 (FIG. 4), made from beryllium copper, which is applied over the rod 10 and engages the channel-shaped member 2 to secure the optical fibres 3, 4 with their end faces abutting in the interstitial space 9.

The spring clip has a window 12 allowing for visual inspection of the joint.

An outer crowd 13 (FIG. 5) is then clipped around the joint and fastened by tabs 14 to a support member 15.

The invention is not restricted to the joint as hereinbefore described with reference to the drawings. For example, the support device could be part of a base plate of a larger connecting block, the resilient spring clip clamping the holding member in position and engaging the sides of the connecting block. As a further alternative the support device could be so shaped that the or each resilient spring clip engages the two cylindrical rods, or both the rods and the support device.

I claim:

1. A disconnectable optical fibre joint comprising a sub-assembly comprising a substantially rigid elongate support device and two cylindrical rods carried by the support device and constrained by the support device to lie in tangential contact with one another with their longitudinal axes substantially parallel, the cylindrical rods defining between them an interstitial space; two optical fibres aligned in the interstitial space with their end faces substantially abutting; an elongate holding member positioned over the ends of the optical fibres and covering the interstitial space over at least a part of its length; and at least one resilient spring clip applied over the elongate holding member and engaging the sub-assembly to urge the elongate holding member towards the two rods so that the optical fibres are secured with their end faces substantially abutting in the interstitial space between the two rods; wherein each optical fibre is surrounded by a sheath with the ends of the optical fibres bared to facilitate jointing, and wherein the support device of the sub-assembly is of elongate form and has integral with and spaced from each of its ends, means by which the sheath of each optical fibre can be secured.

2. A joint as claimed in claim 1, wherein the two cylindrical rods of the sub-assembly are of substantially the same cross-sectional shape and size.

3. A joint as claimed in claim 1 wherein the elongate holding member is also a cylindrical rod.

4. A joint as claimed in claim 1 wherein each of the two cylindrical rods of the sub-assembly and the elongate holding member are of a material having a low co-efficient of thermal expansion.

5. A joint as claimed in any one of claims 1, 2, 3 or 4, wherein each of the means for securing the optical fibre sheaths is a ferrule and wherein the longitudinal axes of the ferrules and the longitudinal axis of the interstitial space defined by the two cylindrical rods of the sub-assembly lie in the same plane.

6. A joint as claimed in claim 5, wherein the longitudinal axes of the ferrules lie at an acute angle to the longitudinal axis of the interstitial space.

* * * * *

UNITED STATES PATENT AND TRADEMARK OFFICE
CERTIFICATE OF CORRECTION

PATENT NO. : 4,353,619

DATED : October 12, 1982

INVENTOR(S) : DAVID T. PARR

It is certified that error appears in the above-identified patent and that said Letters Patent are hereby corrected as shown below:

Column 3, line 11, "crowd" should be --cover--.

Signed and Sealed this

Twenty-fifth Day of January 1983

[SEAL]

Attest:

GERALD J. MOSSINGHOFF

*Attesting Officer*  *Commissioner of Patents and Trademarks*